(No Model.)
J. C. WADLEIGH.
GELATINE EYE DISK.
No. 273,410. Patented Mar. 6, 1883.
Witnesses:
C. E. Gaylord.
L. M. Freeman.
Inventor
Jno. C. Wadleigh
By L. B. Coupland & Co.
Attys

United States Patent Office.

JOHN C. WADLEIGH, OF CHICAGO, ILLINOIS.

GELATINE EYE-DISK.

SPECIFICATION forming part of Letters Patent No. 273,410, dated March 6, 1883.

Application filed October 21, 1882. (No model.)

*To all whom it may concern:*

Be it known that I, JOHN C. WADLEIGH, of Chicago, county of Cook, and State of Illinois, have invented or discovered certain new and useful Improvements in Soluble Gelatine Eye-Disks, of which the following is a description that will enable others to make and use the same, reference being had to the accompanying drawing, and to letters of reference marked thereon, forming a part of this specification.

This invention relates to an improved soluble medicated eye-disk which is adapted to conform to the shape of the eye and be retained in place by the pressure of the eyelid.

The design shown in the drawing is of a concave-convex form, and may be made of any suitable plastic substance which will readily absorb the various remedies used, and at the same time gradually dissolve when applied in the treatment of diseases.

In the manufacture of the eye-disks I usually prefer gelatine and glycerine, which possess within themselves certain medicinal properties and readily absorb the various medicated compositions or remedies that are used in the treatment of different diseases.

The proper treatment of the eye is attended with considerable difficulty, as the remedies are not easily applied, and very often cannot be retained a sufficient length of time to have the desired result. My soluble eye-disk entirely obviates these objections, as it can be inserted and retained in place by the pressure from the eyelid diffusing the medicinal properties of the suppository as it gradually dissolves.

I am aware of English Patent No. 1,451 of 1873 for a medicated lozenge. I therefore do not broadly claim any matter therein set forth.

Having thus described my invention, what I claim as new, and desire to secure by Letters Patent, is—

A soluble medicated eye-disk having one face concave to fit the ball of the eye and the other face convex to permit the eyelid to cover and hold the disk against the eye, for the purpose set forth.

JOHN C. WADLEIGH.

Witnesses:
L. M. FREEMAN,
L. B. COUPLAND.